United States Patent [19]

Yasuda

[11] 4,078,527
[45] Mar. 14, 1978

[54] WASTE-GAS SUPPRESSOR FOR INTERNAL-COMBUSTION ENGINES

[76] Inventor: Sachio Yasuda, 25-144, Kitadaimotsu-cho Hyogo Prefecture, Amagasaki, Japan

[21] Appl. No.: 748,955

[22] Filed: Dec. 9, 1976

[30] Foreign Application Priority Data

Jan. 14, 1976  Japan .................................. 51-3653

[51] Int. Cl.² ........................................... F02D 19/00
[52] U.S. Cl. ............................... 123/25 B; 123/25 L; 123/25 P
[58] Field of Search ............... 123/25 R, 25 A, 25 B, 123/25 D, 25 L, 25 M, 25 N, 25 P; 261/18 A; 150/52 E, 2.1

[56] References Cited

U.S. PATENT DOCUMENTS

| | | | |
|---|---|---|---|
| 1,312,948 | 8/1919 | Bushey | 123/256 X |
| 1,357,039 | 10/1920 | Duntley | 123/25 B |
| 1,405,062 | 1/1922 | Moyer | 123/25 L |
| 1,473,506 | 11/1923 | Nessler | 150/52 E X |
| 1,539,560 | 5/1925 | Harmon | 123/25 L |
| 1,897,025 | 2/1933 | Palmer | 150/2.1 |
| 2,188,175 | 1/1940 | Condon | 123/25 L |
| 2,444,628 | 7/1948 | Buggs et al. | 123/25 B |
| 2,836,403 | 5/1958 | Volcher | 123/25 A |
| 3,856,901 | 12/1974 | Neumamn et al. | 123/25 R X |
| 3,955,542 | 5/1976 | Skaggs | 123/25 L |

*Primary Examiner*—Charles J. Myhre
*Assistant Examiner*—Ira S. Lazarus
*Attorney, Agent, or Firm*—Gabriel P. Katona

[57] ABSTRACT

Waste-gas suppressor for internal-combustion engines, utilizing negative pressure generated in the carburetor of the engine. A flow-regulator valve operated by the negative pressure adjusts water flow in proportion to engine speed, the water being evaporated by the exhaust heat of the engine. The resulting steam is supplied to the combustion chamber of the engine.

11 Claims, 9 Drawing Figures

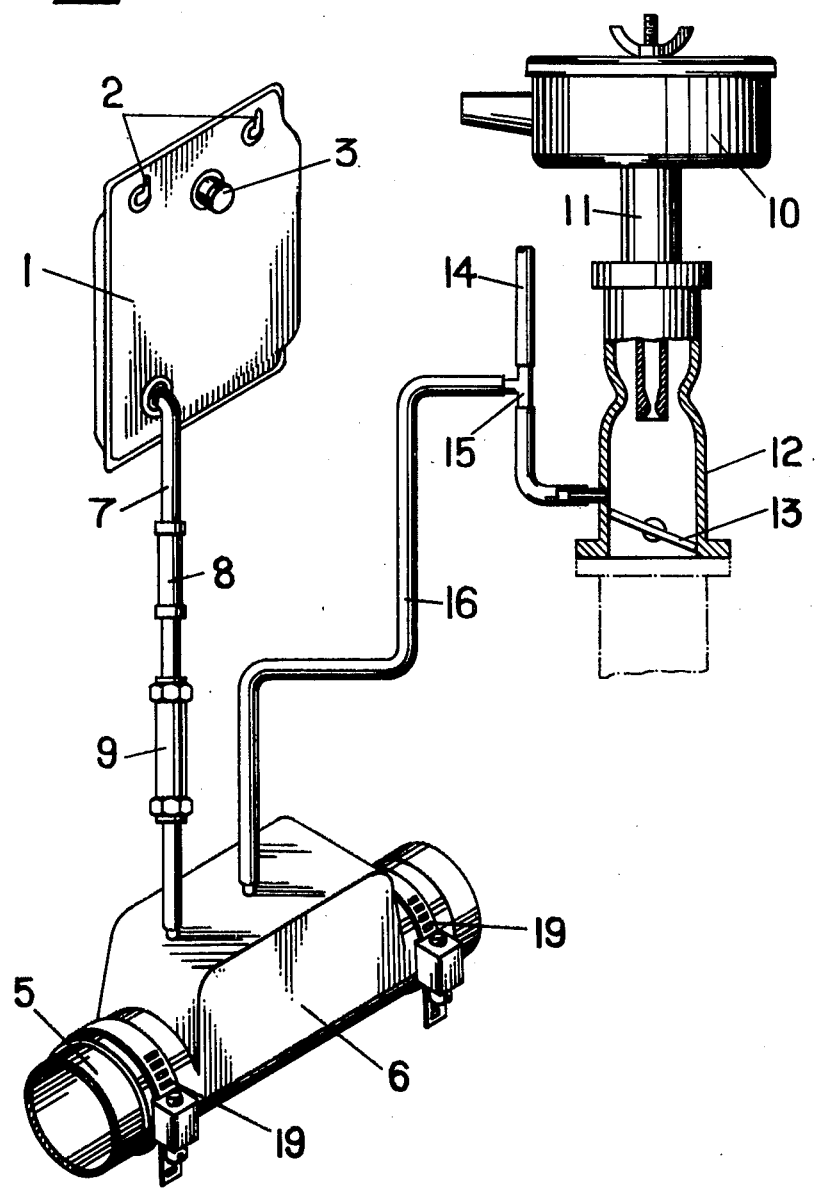

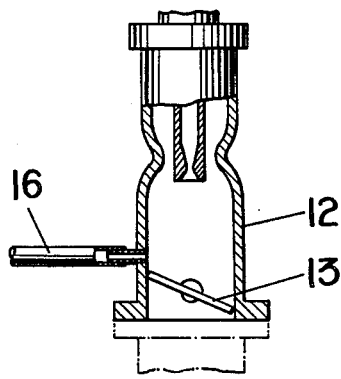
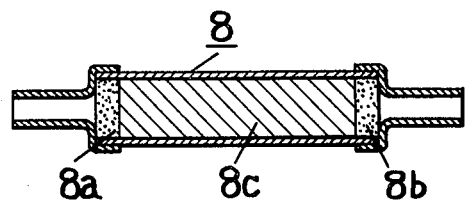
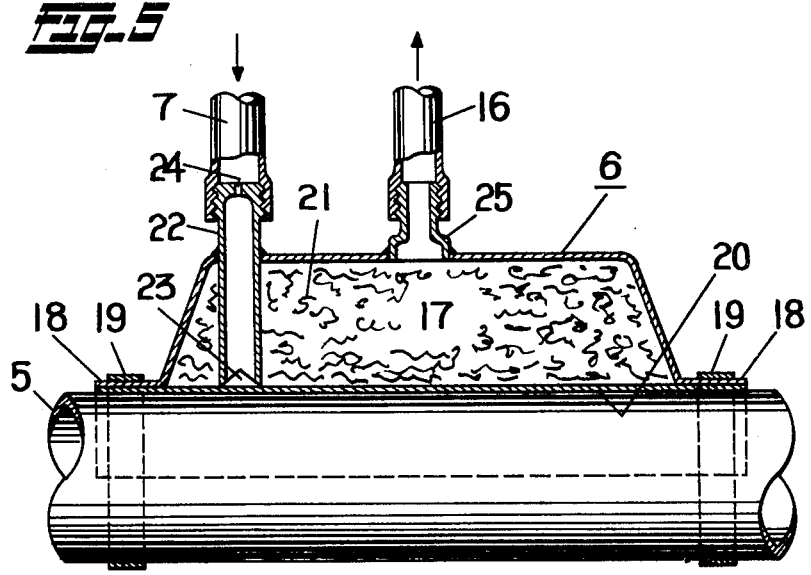

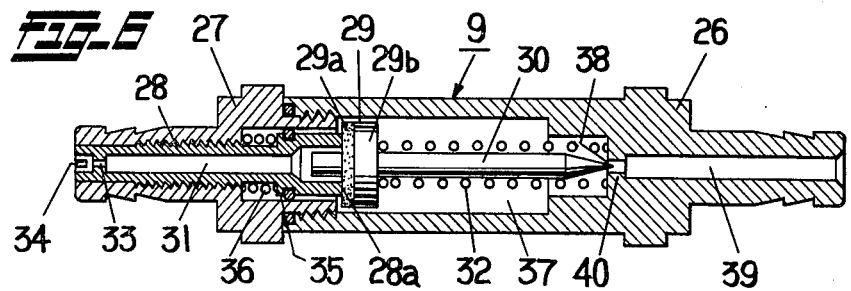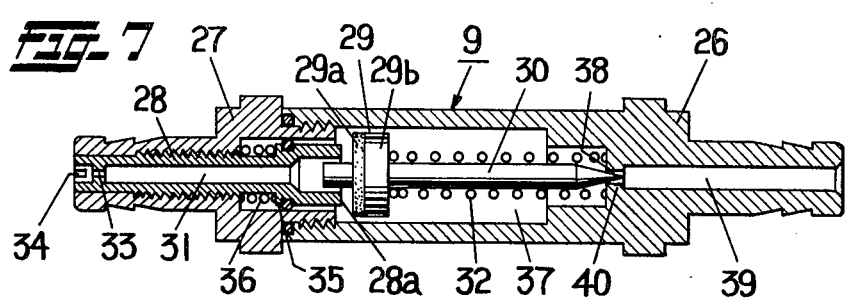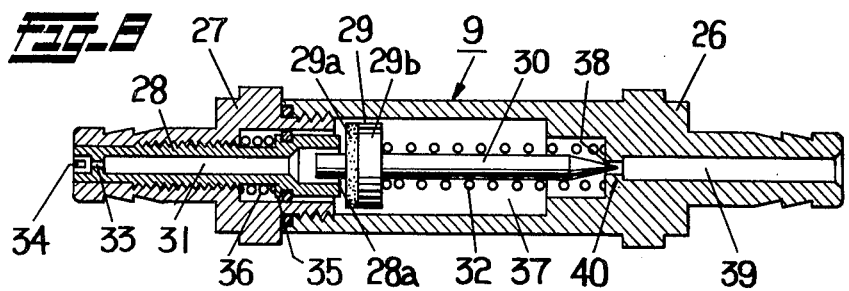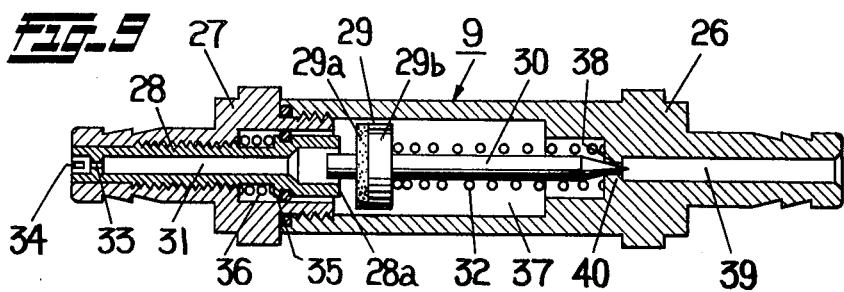

WASTE-GAS SUPPRESSOR FOR INTERNAL-COMBUSTION ENGINES

This invention relates to a device that suppresses the generation of harmful gases contained in waste gas, discharged from internal-combustion engines, e.g. of cars.

More specifically, the invention relates to a device which suppresses the generation of waste gas by evaporating water by the exhaust heat of the engine, leading the steam to the combustion chamber of the engine, and uniformly distributing the combustion temperature of the explosive mixture.

The principal object of the present invention is consequently to diminish harmful ingredients in waste gases, especially nitrogen oxide. Nitrogen oxide in waste gas of cars having gasoline engines is generated only at temperatures above approx. 1000° C. Carbon monoxide, on the other hand, is generated largely because the air supply is insufficient (low air - fuel ratio), and partly because the temperature drops near the combustion-chamber wall, which results in incomplete combustion. In addition, hydrocarbons are pyrolyzed and then discharged in the waste gas when combustion is incomplete.

Generally speaking, it is greatly effective, for diminishing nitrogen oxide, to lower the air - fuel ratio to less than the theoretical value. However the lower fuel ratio has a contrary effect, namely in increasing the generation of carbon monoxide.

Experimental reports show that the later ignition takes place, the lower are the densities of nitrogen oxide and hydrocarbons in the waste gas. However it is difficult to delay ignition for too long as this also lowers the general efficiency of output, economy, driving stability and other parameters.

One can easily guess that the discharge of nitrogen oxide is influenced by the quantity of water contained in the air from the effect that the water in the engine space reduces the generation of nitrogen oxide. This effect reduces the combustion speed of the mixture, reduces the highest combustion temperature, and then diminishes the generative quantity of nitrogen oxide by adding to the mixture inactive materials which do not contribute to combustion.

Therefore, if a water jet is introduced into the combustion chamber of an engine, in the state of a relatively high-temperature steam, it promotes thermal reaction of oxygen, the ingredient of steam, and thus promotes complete combustion.

However, such devices have not been produced in a practical form up to the present because no devices could be provided so far that would produce steam so economically and easily as is necessary for practical purposes.

Therefore, another object of the invention is to provide a device that generates steam at very low cost, utilizing the high-temperature exhaust heat of the engine itself.

The amount of steam jet used has to be controlled accurately in proportion to the supplied quantity of fuel in order to improve the combustion effect in the engine space.

The inventor has noted the phenomenon that the negative pressure is generated in the carburetor of the engine, during the intake stroke when the engine is started, and that this negative pressure increases and decreases in proportion to the speed of the working piston. He has then tried to adjust the degree of opening of the flow-regulator valve according to the strength of the negative pressure, and to operate the valve by the negative pressure, by which he has succeeded in controlling the jetted quantity of steam in a proportion correlated to the supplied quantity of fuel.

It is most important that the supplied water not be permitted to enter the inside of the carburetor through the flow-regulator valve when the same is operated by the suction force generated in the carburetor.

Accordingly, a further object of the invention is to provide a water regulator which does not permit water to enter the carburetor while it acts accurately according to the force of the negative pressure.

The quantity of steam supplied to the combustion chamber is adjusted in proportion to the exhaust-gas capacity of the engine, for the fuel consumption increases and decreases in proportion to that exhaust-gas capacity.

Therefore, a yet further object of the invention is to provide a flow-regulator valve which controls the quantity of supplied steam in proportion to the exhaust-gas capacity of the engine.

In its most important aspects, the invention is characterized in that the highest combustion temperature, around the spark plugs of the engine, at the center of the combustion chamber, decreases at the time of explosion as the steam is distributed uniformly inside the chamber according to the present invention. This suppresses the generation of a large temperature difference between the center and near the walls of the combustion chamber.

The invention is further characterized in that complete combustion of the mixture is made to occur by a thermal reaction of oxygen, the ingredient of steam, which suppresses the generation of carbon monoxide.

The invention is also characterized by a time lag of the explosion from the ignition, occurring as a result of the before-mentioned complete combustion and the mixing of the steam into the mixture, which results in a considerable decrease of the generative quantity of the hydrocarbons.

Finally, the invention is characterized in that the output of the engine is made to increase because of the complete combustion in the explosion of the mixture at small temperature differences inside the combustion chamber, which results in the possibility of cutting the quantity of the required fuel, as well as in the reduction of carbon sticking inside the cylinders, which prolongs the span of the engine life.

To be more precise, the present invention relates to an earlier patent, namely U.S. Pat. No. 3,996,902 of Dec. 14, 1976, in which the inventor of the present application was a co-inventor, the patent being titled "Waste-Gas Suppressor for Internal-Combustion Engines," of which it constitutes an improvement. According to that patent, the inside of the casing of the water regulator is divided into two parts, namely a water-flow path and an air-tight chamber which operates a diaphragm or the like that divides the casing (details were not given in the description of the earlier patent). A conduit from the tank is connected with the inlet of the water-flow path, another conduit to the steam generator with the outlet, and a suction tube with the air-tight chamber.

As above-described, at least three tubes have to be connected to the water regulator in the earlier patent.

The water fed from the regulator is evaporated in the steam generator, the steam being led to the air cleaner, to be fed to the carburetor together with the cleaned air obtained from the air cleaner.

There was accordingly a problem in the earlier invention in that the steam might be reduced to water on its long way from the steam generator to the carburetor.

The present invention improves the just explained defect of the earlier development and eliminates its operational drawbacks. By forming the water-flow path in the casing of the flow-regulator valve, and the airtight chamber in a single valve chamber, and by utilizing a single hole as a negative-pressure inlet and water outlet, the structure has been simplified and only two pipes are required: a pipe to let the water in, and another pipe to discharge the water, connected with the flow-regulator valve.

Moreover, according to the present invention, the steam generator is directly connected with the carburetor by a steam tube so that the generated high-purity steam is led to the carburetor without being reduced to water. As a result, the engine operates very well.

Furthermore the conduit, the sealed inner space of the steam generator and the steam tube which are provided between the flow-regulator valve and the carburetor constitute a suction circuit to provide the aforesaid valve with the negative pressure, so that less pipes are needed in number than those of the former invention. The assembly and maintenance of the inventive device are consequently much simpler and less prone to disturbances or breakdowns.

Other objects and many of the attendant advantages as well as important features of the invention will become better understood by reference to the following description when considered with the accompanying drawings, wherein FIG. 1 is an overall perspective illustration of an internal-combustion engine having the waste-gas suppressor according to the present invention attached near the engine;

FIG. 2 is a somewhat schematic overall illustration of an exemplary embodiment of the waste-gas suppressor;

FIG. 3 is a partial illustration of a modified carburetor for the device according to the invention, showing a connection that is different from that of FIG. 2;

FIG. 4 is a cross-sectional view of a filter used in the device of the invention;

FIG. 5 is a longitudinal elevational view of the steam generator for the device of the invention; and FIGS. 6 to 9 are similar longitudinal elevational views showing a flow-regulator valve constituting an important part of the device of the invention, illustrated in different working states.

Figure 1:
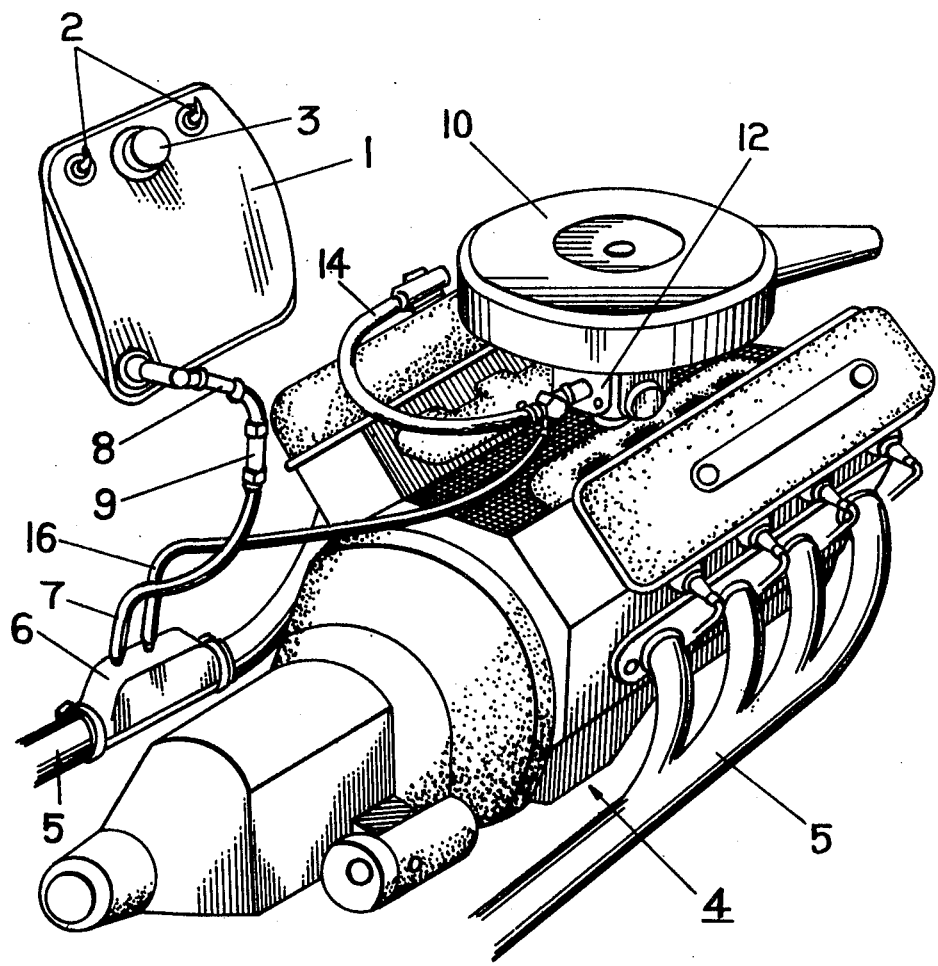

In FIGS. 1 and 2, numeral 1 denotes a water reservoir in which, as a matter of example, vinyl chloride is used as a surface material, and canvas is glued or otherwise attached to the back thereof for heat resistance, for protection against cold and oil. The reservoir 1 is firmly set inside the fender of the front wheels of a car by a hook 2 and can be filled with water, preferably distilled water, the reservoir being tightly closable by a spigot 3. The reservoir 1 leads to a steam generator 6 set firmly at the outer periphery of an exhaust pipe 5 of an internal-combustion engine 4 through a conduit 7. Into the latter, a filter 8 and a flow-regulator valve 9 are set.

As shown in FIG. 4, the filter 8 consists preferably of felt layers 8a, 8b and ion-exchange resin layers 8c, the former for treating and catching micron-size dust particles. Thus impurities contained in water, and particularly in hard water that contains iron, bleaching powder and the like, are removed.

The cleaned air is supplied from an air cleaner 10 to a carburetor 12 through a tube 11. Then the cleaned air is supplied in the fuel mixture to the combustion chamber. As it is well known, a PCV (positive crankcase ventilation) hose 14 is connected in the carburetor 12 with the crankcase of the engine 4, at a position above a throttle valve 13, which hose prevents the discharge of blown-out gas.

As shown in FIG. 2, according to the invention, a Y-shaped joint 15 is set into the hose 14, and a steam tube 16 whose one end is connected with the steam generator 6 is connected with the hose 14 through the joint 15, and the steam generator 6 is connected with the carburetor 12 through the hose 14.

Several kinds of internal-combustion engines do not have PCV hoses. In such cases the other end of the steam tube 16 is connected directly with the upper portion of the carburetor 12, as shown in FIG. 3. It will be understood that the latter illustration constitutes a continuation of the left-hand portions of FIG. 2 and should be studied together therewith, however omitting the described elements 10 through 13 as well as 14 and 15, the two latter not being necessary in the modified arrangement of FIG. 3.

The water in the reservoir 1 is supplied to a sealed inner space 17 of the steam generator 6 (FIG. 5) through the conduit 7, the water in the space 17 being evaporated by the exhaust heat conducted to the exhaust pipe 5, and then the evaporated water is jetted into the carburetor 12 through the steam tube 16, through or without the PCV hose 14, and is supplied to the combustion chamber of the engine 4 in the fuel mixture.

The steam generator 6 has therein the sealed inner space 17 and flange portions 18 on both sides for fixation. The generator 6 is connected with the peripheral surface of the exhaust pipe 5 leading from the engine, and is then fixed by clamps 19 for connecting the portions 18 with the exhaust pipe 5. It should however be understood that the space 17 is not exclusively contemplated to be used in the generator 6 since the invention considers its use elsewhere in the system, as will be self-explanatory to those skilled in the art.

It has been confirmed by experiments that metal-fiber cement, e.g. copper-powder cement 20 (see again FIG. 5) of high conductivity brings about higher thermal efficiency when distributed between the steam generator 6 and the exhaust pipe 5. Reticulate or porous substances 21 are filled uniformly into the sealed space 17, such as layers of stainless-steel meshes, metallic wool, glass wool, rock fiber and non-woven cloth. Evaporation is promoted by the provision of these substances because the water supplied from the conduit 7 is distributed uniformly to the substances by their capillarity, and these materials maintain the steam for a limited time after evaporation by the storage action of heat.

This makes it possible to supply the steam to the tube 16 the moment the engine starts, within several minutes after the stopping of the engine. Even if the engine may stop for several hours, the moisture maintained uniformly in the substances 21, by their heat storage capability, is evaporated in a few minutes after the starting of the engine, and then supplied to the tube 16.

In addition, the lower end of a short tube 22, which connects with the conduit 7, touches the bottom near the exhaust pipe 5, and water can flow through a notch 23 of that tube end. The other end of the tube 22 forms an aperture 24 of a small diameter to prevent the steam from entering backward to the conduit 7 through the tube 22.

The steam generated in the inner space 17 of the generator 6 rises by itself as will now be described. One end of another short tube 25, the diameter of which is larger than that of the tube 22, is connected with the top of the generator 6 in order to lead away the steam therefrom.

The flow-regulator valve 9 which constitutes an important part of the invention is operated by the negative pressure generated in the carburetor 12 through the sealed inner space 17 of the generator 6. The structure and the operational states are shown in FIGS. 6 to 9. The valve 9 has a valve body 26, a cover 27 mounted water-tightly to the body 26 in spiral form, a flow-adjusting threaded tube 28 attached in the cover 27, also in spiral form, which may move back and forth freely, a needle spool 30 having a sealing member 29 on one end thereof and being contained in the body 26, and a coil spring 32 which pushes the spool 30 in order that the member 29 might normally close a water-inlet hole 31 of the tube 28 as the result of connection with a surface 28a of the tube 28. The hole 31 connects with the conduit 7 provided at the cover 27, and has a flow path 33 of a small diameter to maintain the quantity of the passing water.

A notched portion 34 is provided at one end of the tube 28, which leads to the water-inlet hole 31, allowing a screwdriver to be applied thereto, the threaded tube 28 then moving back and forth along the cover 27 by the adjusting action (rotation) of the screwdriver, for adjustment purposes to be described later. A spring seat 35 projects from the periphery of the tube 28, a lock spring 36 being inserted between the cover 27 and the seat 35 to prevent the tube 28 from moving away even slightly from the adjusted position.

The sealing member 29 comprises nitrile rubber 29a having high water-tightness, and a polycarbonate resin 29b, the former being used for the part contacting a surface 28a of the threaded tube 28, and the latter for another part. It might be added at this point that the reference numerals 37 to 40 will be described somewhat later.

With reference to FIG. 6 it can be explained that the needle spool 30 is pushed by the coil spring 32 when the engine 4 does not work, the sealing member 29 contacts close to the surface 28a of the tube 28 and closes the hole 31 to prevent water drops from flowing from the hole 31 into a valve chest or chamber 37 of the valve body 26, as illustrated.

It is well known that, when an internal-combustion engine operates, the negative pressure generated in the carburetor is lowest during constant and accelerated rotation of the engine. Then the negative pressure increases during no-load rotation (idling) of the engine, and the pressure is highest during decelerated rotation of the engine.

Taking into consideration the above-mentioned point, the present invention is characterized in that the needle spool 30 of the flow-regulator valve 9 automatically adjusts the degree of opening of a valve hole 38 of the valve body 26 by a difference between the pressure of the spring 32, which pushes the needle spool 30, and the negative pressure which tends to pull the spool 30.

FIG. 7 shows a state during the no-load rotation of the engine, in which the negative pressure is considerably high. In this state the spool 30 moves almost to the position closing the hole 38 against the pressure of the spring 32 to keep the hole 38 slightly opened which leads to a water outlet hole 39. The water drops emerging from the opening between the surface 28a of the tube 28 and the member 29 into the chest 37 push a further, extremely small quantity of the water from the hole 38 to the steam generator 6 through the outlet 39.

FIG. 8 shows a state during the constant and accelerated rotation of the engine in which the negative puressure is low. In this state the negative pressure is lower than that of FIG. 7, accordingly the spool 30 is pushed slightly by the spring 32 to increase the degree of opening of the hole 38, and a proper quantity of water is fed from the latter hole to the steam generator 6. It is necessary that the degree of the opening of the hole 38 be adjusted to maximum during the constant and accelerated rotation of the engine.

FIG. 9 finally shows a state dur-ng the decelerated rotation of the engine in which the negative pressure is highest. In this state, the spool 30 overcomes the pressure of the spring 32 to move forward until the valve hole 38 is completely closed. Accordingly, the water arriving at the valve chest 37 is intercepted in the hole 38 and is prevented from flowing into the water outlet hole 39.

It is important to control properly the jet of steam in proportion to the quantity of the ful supplied when the air containing the steam is fed into the internal-combustion engine.

As will be readily understood from the preceding description, the present invention intends to operate the flow-regulator valve 9 by the negative pressure and at the same time increases the degree of the opening of the valve hole to maximum during the accelerated rotation in which most fuel is supplied, to lead a relatively large quantity of water to the steam generator, then gradually reducing the degree of opening from the state of constant rotation to the no-lead rotation to reduce the water being fed, and thus the water is prevented from entering the steam generator by intercepting the water outlet hole 39 during the decelerated rotation, and the water inlet hole 31 when the engine does not operate, respectively. From these details it should of course be noted that the negative pressure is generated in the carburetor of the engine when it is started, and negative pressure is the highest during the decelerated rotation of the engine, but lower during the no-load rotation (idling), and lowest during the constant and accelerated rotation.

Accordingly, the quantity of water which may flow into the sealed inner space 17 of the steam generator 6 is nearly in proportion to the number of rotations of the engine, and so is the quantity of the steam generated in the space 17 to that of the water, as a matter of course.

The number of rotations of the engine is in proportion to the supplied quantity of fuel such as gasoline or light oil so that a quantity of steam corresponding to the supplied quantity of fuel is fed to the combustion chamber of the engine, and the steam, with a density in proportion to the engine speed, is always fed to the combustion chamber irrespective as to whether the engine, that is the car, runs at high speed or at a lower speed.

Moreover, as stated in the beginning, the quantity of steam supplied to the combustion chamber should also be decided in proportion to the exhaust-gas capacity of the engine because fuel consumption increases and descreases in proportion to the exhaust-gas capacity of the engine.

The flow-regulator valve 9 according to the present invention has the earlier-described construction. The flow-adjusting threaded tube 28 has the water-inlet hole 31 provided in the cover 27 so as to move back and forth, the needle spool 30 having the sealing member 29 at one end thereof, provided in the body 26 to move between the surface 28a of the tube 28 and a valve seat 40 of the body 26. Consequently when the tube 28 moves toward the chest 37, the moving stroke of the needle spool 30 is much shorter, and the maximum degree of opening of the valve hole 38 will also be much less. As a result, the generative quantity of the steam reduces.

On the contrary, when the tube 28 moves back under way from the valve chest 37, the moving stroke of the spool 30 becomes longer, the maximum degree of opening of the hole 38 increases, and so much does the generative quantity of the steam increase. Accordingly, the present invention provides the necessary quantity of steam in proportion to the exhaust-gas capacity of the engine by adjusting only the tube 28 of the valve 9.

Data are given below which prove the fact that an internal-combustion engine provided with the waste-gas suppressor of the present invention satisfactorily fulfills the objects mentioned in the beginning, in comparison with any other engine of the conventional type. These data are based on measurements that were carried out at Olson Engineering Inc., a Vehicle Test Facility authorized by the California Air Resources Board.

|  | Produced Waste Gases | | | | Performance Miles per Gallon |
| --- | --- | --- | --- | --- | --- |
|  | HC | CO | NO | CO$_2$ |  |
| Internal-combustion engine (alone) | 0.46 | 6.29 | 1.65 | 663.54 grams | 13.15 |
| Engine fitted with the inventive Suppressor | 0.4 | 5.79 | 1.23 | 538.92 grams | 16.16 |

The measurements were conducted on Oct. 29 and 30, 1975. An Oldsmobile OMEGA car was used, Model 1975; weight: 4000 pounds.

It will be understood by those skilled in the art that several modifications, changes and/or additions can bemade in the inventive device without departing from the spirit and scope of the invention.

What I claim is:

1. A waste-gas suppressor for an internal-combustion engine (4) which includes a carburetor (12), a combustion chamber and an exhaust pipe (5), the suppressor comprising: a water reservoir (1); a filter (8); a flow-regulator valve (9) having means (28) to adjust and control automatically the flow of water from said reservoir by negative pressure generated in said carburetor, and at the same time to control maximum water flow in said valve; a negative-pressure inlet and a water inlet being constituted by a single common hole (39) within said valve; a steam generator (6) which evaporates the water supplied to the same through said filter, said valve and a conduit (7), by the heat of said exhaust pipe in a sealed space (17) of said generator; and a steam tube (16) which leads the steam generated in said generator directly into said carburetor; wherein said conduit, said inner space and said steam tube constitute a suction circuit to provide the negative pressure from said carburetor to said valve.

2. The suppressor as defined in claim 1, wherein a soft synthetic resin sheet is used as a surface material for said water reservoir (1), and canvas is applied to the back thereof.

3. The suppressor as defined in claim 1, wherein said filter (8) is formed with felt layers (8a, 8b) and with ion-exchange resin layers (8c) which lie between said felt layers.

4. The suppressor as defined in claim 1, wherein said valve (9) includes a body (26) having a chest (37) and a water-outlet hole (39) constituting said single common hole, a cover (27) mounted water-tightly to said body in spiral form, said adjusting means (28) being attached in spiral form within said cover so as to be freely adjustable, a needle spool (30) in which a sealing member (29) is provided at one end, contained in said body, and a spring (32) around said spool and whose pressure against said sealing member is set so that a water-inlet hole (31) is ordinarily closed by said sealing member, said spool closing said outlet hole at the opposite side by the negative pressure from said carburetor (12) during decelerated rotation of the engine (4), a valve hole (38) being opened slightly during no-load rotation of the engine, and said valve hole being maximally opened during constant accelerated rotation of the engine.

5. The suppressor as defined in claim 4, wherein said adjusting means (28) includes a threaded tube attached in spiral form to said cover (27) so as to move freely, the inside of said tube forms said water-inlet hole (31), a surface (28a) of said threaded tube forms a stopper which controls the moving stroke of said spool (30), and another surface of said threaded tube forms a notched portion (34) for an external screwdriver and the like tool used to adjust said threaded tube.

6. The suppressor as defined in claim 5, wherein said sealing member (29) includes at least one nitrile-rubber layer (29a) having high water-tightness, and at least one polycarbonate-resin layer (29b).

7. The suppressor as defined in claim 5, wherein said water-inlet hole (31) is a narrow aperture defining a flow path (33) of a small diameter.

8. The suppressor as defined in claim 1, wherein said sealed space (17) is filled with at least one reticulate and porous substance (21), such as layers of stainless meshes, metallic wool, glass wool, rock fiber and non-woven cloth.

9. The suppressor as defined in claim 8, wherein said generator (6) includes a first short tube (22) of said conduit (7), which also leads to said sealed space (17), and a second short tube (25) of said steam tube (16), said first short tube being formed so that at one end thereof an aperture (24) of a small diameter is made, and the other end thereof reaches the bottom of said sealed space, while said second short tube has a larger diameter than that of said first short tube, and connects with the top of said sealed space.

10. The suppressor as defined in claim 1, wherein one end of said steam tube (16), whose other end is attached to said generator (6), connects with a positive crankcase-ventilation (PCV) hose (14) to a Y-shaped joint (15).

11. The suppressor as defined in claim 1, wherein one end of said steam tube (16), whose other end is attached to said generator (6), connects directly with said carburetor (12).

* * * * *